United States Patent
Schwartz et al.

(10) Patent No.: US 11,978,204 B2
(45) Date of Patent: May 7, 2024

(54) SYSTEMS AND METHODS FOR DETERMINING PHYSICAL PARAMETERS OF FEET

(71) Applicant: Aetrex, Inc., Teaneck, NJ (US)

(72) Inventors: Laurence I Schwartz, New York, NY (US); Kumar Rajan, Clinton, NJ (US); Sae Hwang, Englewood Cliffs, NJ (US); Alexander Choy, Fort Lee, NJ (US)

(73) Assignee: Aetrex, Inc., Teaneck, NJ (US)

( * ) Notice: Subject to any disclaimer, the term of this patent is extended or adjusted under 35 U.S.C. 154(b) by 0 days.

(21) Appl. No.: 18/205,449

(22) Filed: Jun. 2, 2023

(65) Prior Publication Data

US 2023/0316515 A1 Oct. 5, 2023

Related U.S. Application Data (63) Continuation of application No. 17/871,828, filed on Jul. 22, 2022.

(60) Provisional application No. 63/225,345, filed on Jul. 23, 2021.

(51) Int. Cl.
*G06T 7/00* (2017.01)
*G06T 7/55* (2017.01)

(52) U.S. Cl.
CPC .............. *G06T 7/0012* (2013.01); *G06T 7/55* (2017.01); *G06T 2207/10028* (2013.01)

(58) Field of Classification Search
CPC ................... G06T 7/0012; G06T 7/55; G06T 2207/10024; G06T 2207/10028; G06T 2207/20081; G06T 2207/20084; G06T 2207/30196; G06T 7/66
See application file for complete search history.

(56) References Cited

U.S. PATENT DOCUMENTS

| | | | |
|---|---|---|---|
| 6,735,547 B1 | 5/2004 | Yfantis | |
| 10,701,999 B1 | 7/2020 | Borenstein et al. | |
| 2008/0002911 A1 | 1/2008 | Eisen et al. | |
| 2017/0272728 A1* | 9/2017 | Rafii | G06Q 30/0631 |
| 2018/0096481 A1 | 4/2018 | Schwartz et al. | |
| 2019/0139252 A1* | 5/2019 | Zaiss | A43D 1/025 |
| 2020/0097635 A1 | 3/2020 | Schouwenburg et al. | |
| 2021/0374985 A1 | 12/2021 | Bleicher et al. | |
| 2022/0198552 A1* | 6/2022 | Burnic | G06Q 30/0621 |

OTHER PUBLICATIONS

International Search Report and Written Opinion of International Application No. PCT/US2022/038101 mailed Dec. 8, 2022, 22 pgs.
Chun et al., "A foot-arch parameter measurement system using a RGB-D camera", Sensors, 2017, vol. 17, 1796, 26 pgs.

* cited by examiner

*Primary Examiner* — Jon Chang
(74) *Attorney, Agent, or Firm* — Lowenstein Sandler LLP (57) ABSTRACT

Methods, systems, and non-transitory computer readable media for computing physical dimensions of feet based on user-captured images are described. In at least one embodiment, an exemplary method comprises: receiving, by a server from a user device, an image of the user's foot or feet; segmenting the image to identify the user's foot or feet; computing the one or more physical parameters of the user's foot or feet.

20 Claims, 10 Drawing Sheets

Segmented Image

Original Image

SYSTEMS AND METHODS FOR DETERMINING PHYSICAL PARAMETERS OF FEET

CROSS-REFERENCE TO RELATED APPLICATION(S)

This application is a continuation of U.S. patent application Ser. No. 17/871,828, filed on Jul. 22, 2022, which claims the benefit of priority of U.S. Provisional Patent Application No. 63/225,345, filed on Jul. 23, 2021, the disclosures of which are hereby incorporated by reference herein in their entireties.

TECHNICAL FIELD

The present disclosure relates to systems and methods for determining physical parameters of feet, such as shoe size and foot width.

BACKGROUND

Foot problems and the corresponding costs associated with foot care cost millions of dollars each year. Foot pain and other foot-related problems often impact an individual's physical activities at work and in leisure time. Foot problems can arise from, among other things, improperly fitting footwear, improper foot alignment, poor arch support, prolonged and uncomfortable standing, walking or athletic activities, medical conditions, and the like.

Currently, there are various methods by which an individual can measure their feet remotely so that footwear and orthotic devices can be ordered without the need to be physically present at the point of retail or at a clinician's office. However, these approaches can provide inaccurate results, and the measurement procedure can be very complicated and tedious to implement with the user's mobile device.

SUMMARY

The following presents a simplified summary of various aspects of the present disclosure in order to provide a basic understanding of such aspects. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

In one aspect, a method of computing one or more physical parameters of a user's foot or feet comprises: receiving, by a server from a user device, an image of the user's foot or feet; segmenting the image to identify the user's foot or feet and a fiducial marker present in the image; and computing the one or more physical parameters of the user's foot or feet based on at least one known dimension of the identified fiducial marker.

In at least one embodiment, the fiducial marker corresponds to an object having dimensions of a standard credit card.

In at least one embodiment, sensitive information present on the fiducial marker is masked by the user device prior to being received by the server.

In another aspect, a method of computing one or more physical parameters of a user's foot or feet comprises: receiving, by a server from a user device, an image of the user's foot or feet and depth map data associated with the image; segmenting the image to identify the user's foot or feet; and computing the one or more physical parameters of the user's foot or feet based on the depth map data.

In at least one embodiment, the depth map data corresponds to data obtained via a LiDAR sensor of the user device.

In at least one embodiment, computing the one or more physical parameters of the user's foot or feet based on the depth map data comprises: detecting, within three-dimensional (3D) point cloud corresponding to the depth map data, a plane representative of a surface on which the user's feet are positioned in the image; generating a 2D projection of the foot or feet by projecting the 3D point cloud onto the plane based on the user's foot or feet identified by the segmentation; and computing a scaling parameter from the 2D projection that is used to compute the one or more physical parameters.

In at least one embodiment, the image is the sole image received from the user device that is used to compute the one or more physical parameters of the user's foot or feet.

In at least one embodiment, the image is received in response to a single user action to capture the image by the user device.

In at least one embodiment, one of the one or more physical parameters include a recommended shoe size and/or a foot width.

In at least one embodiment, the method further comprises: transmitting the one or more physical parameters to the user device to be presented to the user.

In at least one embodiment, the image was captured by a camera of the user device when the direction of the camera was oriented substantially along a normal direction of a surface on which the user's feet were positioned.

In at least one embodiment, segmenting the image to identify the user's foot or feet comprises: for each foot present in the image, applying a deep learning model to detect a centroid of the foot.

In at least one embodiment, segmenting the image to identify the user's foot or feet comprises: for each foot present in the image, applying one or more deep learning models to: segment a foot region within the image; segment a toe region of the foot; segment a heel region of the foot; and generate a combined segmented region from the foot region, the toe region, and the heel region.

In at least one embodiment, the segmenting is performed using a region-based convolutional neural network.

In another aspect, a method of computing one or more physical parameters of a user's feet comprises: generating, for display by a user device, a video feed captured by a camera of the user device; generating an overlay on the video feed, the overlay comprising: a visual indicator of where the user is to position their foot or feet on a surface; and optionally, a visual indicator of where the user is to position a fiducial marker; receiving a user input as a result of a single user action, wherein responsive to the user input, the user device captures one or more images of the user's feet and, optionally, the fiducial marker; transmitting the one or more images to a server, wherein the server is to compute one or more physical dimensions of the user's foot or feet from the one or more images; and presenting for display the one or more physical dimensions of the user's foot or feet received from the server.

In at least one embodiment, the image of the user's foot or feet is captured in response to a single user action with the user device.

In another aspect, a method of computing one or more physical parameters of a user's feet comprises: receiving an image containing both of the user's feet; and deriving the one or more physical parameters from the image, wherein the image is the sole image of the user's feet used to derive the one or more physical parameters, wherein the one or more physical parameters are derived from the image without identifying a fiducial marker within the image.

In another aspect, a method of computing one or more physical parameters of a user's feet comprises: receiving, from a user device, one or more images containing both of the user's feet, the one or more images having been captured in response to a single user action with respect to the user device; and deriving the one or more physical parameters from the one or more images, wherein the one or more physical parameters are derived from the image without identifying a fiducial marker within the one or more images.

In another aspect, a method of computing one or more physical parameters of a user's feet comprises: receiving, from a user device, one or more images containing both of the user's feet, the one or more images having been captured in response to a single user action with respect to the user device; and deriving the one or more physical parameters from the one or more images, wherein the one or more physical parameters are derived from the image based on a fiducial marker identified within the one or more images.

In another aspect, a method of training a deep learning model to segment an image to identify one or more feet present in the image comprises: identifying a labeled training image within a set of labeled training images; identifying a plurality of segmented regions within the labeled training image, wherein the plurality of segmented regions comprises at least a foot region and a background region; generating a plurality of synthetic images based on the labeled training image, wherein each of the plurality of synthetic images comprises the plurality of segmented regions, and wherein a color and/or texture of at least one segmented region within a given synthetic image is varied such that none of the generated synthetic images are identical; including the plurality of synthetic images within the set of labeled training images to produce an augmented set of labeled training images; and training the deep learning model using the augmented set of labeled training images.

In another aspect, a system comprises: a memory; and a processing device operably coupled to the memory, wherein the processing device is configured to perform any of the aforementioned methods.

In another aspect, a non-transitory computer-readable storage medium comprises instructions encoded thereon that, when executed by a processing device, cause the processing device to perform any of the aforementioned methods.

BRIEF DESCRIPTION OF THE DRAWINGS

The present disclosure is illustrated by way of example, and not by way of limitation in the figures of the accompanying drawings.

DETAILED DESCRIPTION

Described herein are technologies that facilitate foot measurements. Specifically, certain embodiments described herein relate to a fully-integrated foot scanning system to help users find the right fitting footwear and orthotics, and provide an enhanced customer experience at retail. In certain embodiments, a process may be commenced by an application on the user's mobile device, which utilizes a user interface to guide the capture of the user's foot or feet. The captured image (or images) can be sent to a data processing server which applies one or more deep learning models to identify feet within the image and compute various physical dimensions thereof, including a shoe size and foot width. The embodiments described herein advantageously provide a fast, easy-to-use scanning process (around 10 seconds total from image capture to results) that is able to accurately measure both feet at once from a single captured image. In at least one embodiment, one or more images of the user's foot (e.g., color images, depth images, a pair of stereoscopic images, etc.) can be captured simultaneously (or near simultaneously) in response to a single user action, such as in response to a user pressing an interactable button on their mobile device, a voice command, or the like.

In certain embodiments, the process may be implemented by the user's mobile device while accessing a website. The website may utilize in-browser functionality (presented via the mobile device as a web application) that enables and facilitates image capture of the user's foot or feet by the user's mobile device, transmits the images to a server (which may be the same server hosting the website), and processes the images to compute various physical dimensions of the foot or feet. Recommendations for footwear or orthotic devices may be served to the user via the website, for example, by redirecting the mobile device's browser to webpages showing footwear or orthotic devices suitable for the user's anatomy. Such embodiments provide an enhanced customer experience by avoiding the requirement that the user download additional software to facilitate image capture or redirect the user's browser to another website. The web application may be designed to accommodate various browsers, cameras, and user devices/operating systems such that it can be implemented in a device independent manner.

In general, deep learning models require large sets of training data in order to produce accurate results and classifications. However, this requires producing a large quantity of high quality training data with correct labels, which is an expensive and time consuming process. Certain embodiments advantageously produce synthetic training data based on existing training data to create copies of the training data having classified regions that vary in color and texture, resulting a numerous permutations. The training data is then supplemented with the synthetic training data to produce even greater training accuracy while reducing the overall costs of generating a training set.

System Architecture

Figure 1:
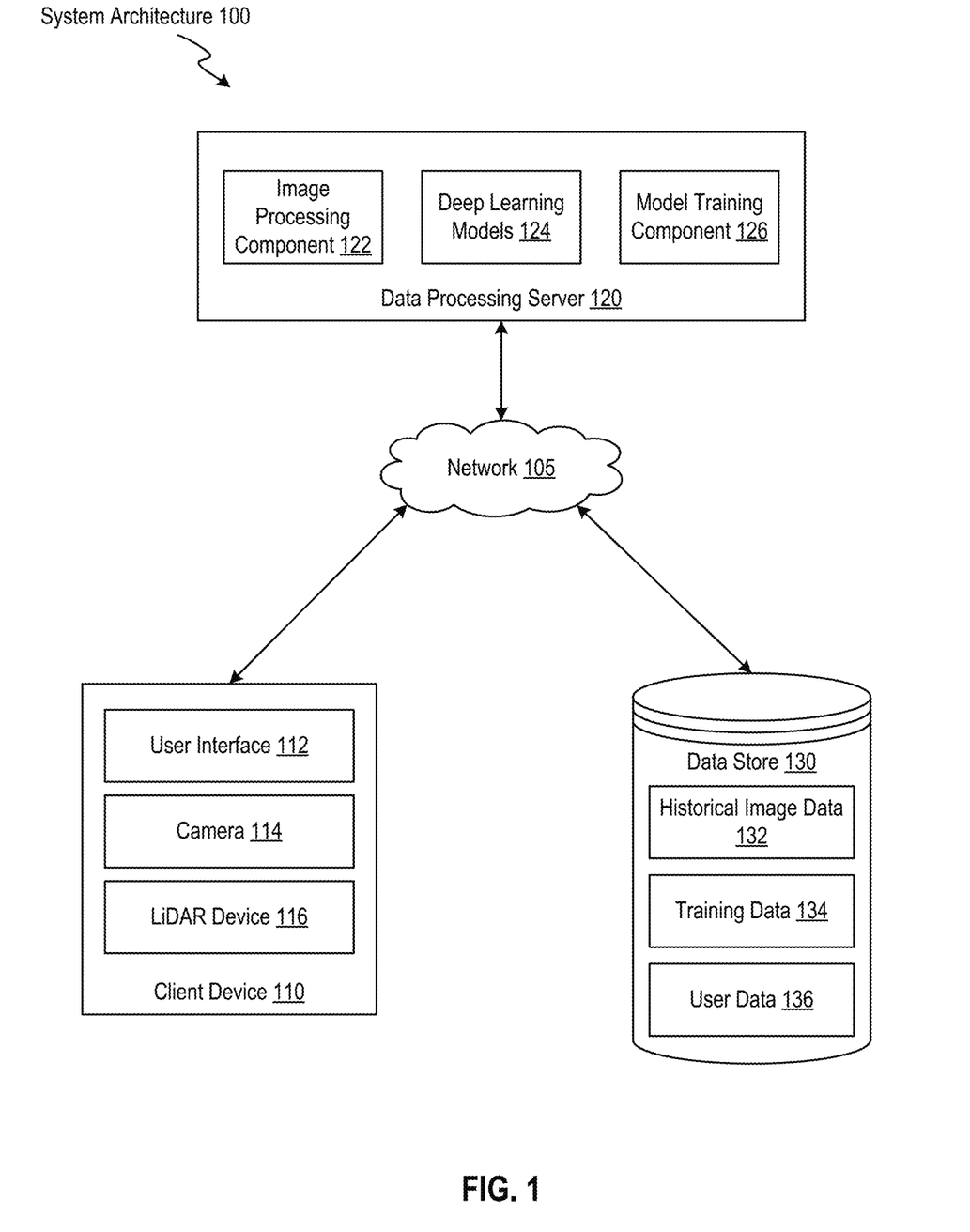
FIG. 1 is a block diagram illustrating an exemplary system architecture, according to at least one embodiment.

Exemplary implementations of the embodiments of the present disclosure are now described. FIG. 1 illustrates an exemplary system architecture 100 in accordance with at least one embodiment. The system architecture 100 includes a client device 110, a data processing server 120, and a data store 130, with each device of the system architecture 100 being communicatively coupled via a network 105. One or more of the devices of the system architecture 100 may be implemented using a generalized computer system 600, described with respect to FIG. 6. The devices of the system architecture 100 are merely illustrative, and it is to be understood that other user devices, data processing servers, data stores, and networks may be present.

In at least one embodiment, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. Although the network 105 is depicted as a single network, the network 105 may include one or more networks operating as stand-alone networks or in cooperation with each other. The network 105 may utilize one or more protocols of one or more devices to which they are communicatively coupled.

In at least one embodiment, the client device 110 (which may also be referred to as a "user device") may include a computing device such as a personal computer (PC), laptop, mobile phone, smart phone, tablet computer, netbook computer, etc. An individual user may be associated with (e.g., own and/or operate) the client device 110. As used herein, a "user" may be represented as a single individual. However, other embodiments of the present disclosure encompass a "user" being an entity controlled by a set of users and/or an automated source. For example, a set of individual users federated as a community in a company or government organization may be considered a "user." In at least one embodiment, the user is the individual who seeks to receive information descriptive of physical parameters of their feet.

The client device 110 may utilize one or more local data stores, which may be internal or external devices, and may each include one or more of a short-term memory (e.g., random access memory), a cache, a drive (e.g., a hard drive), a flash drive, a database system, or another type of component or device capable of storing data. The local data stores may also include multiple storage components (e.g., multiple drives or multiple databases) that may also span multiple computing devices (e.g., multiple server computers). In at least one embodiment, the local data stores may be used for data back-up or archival purposes.

Figure 5A:
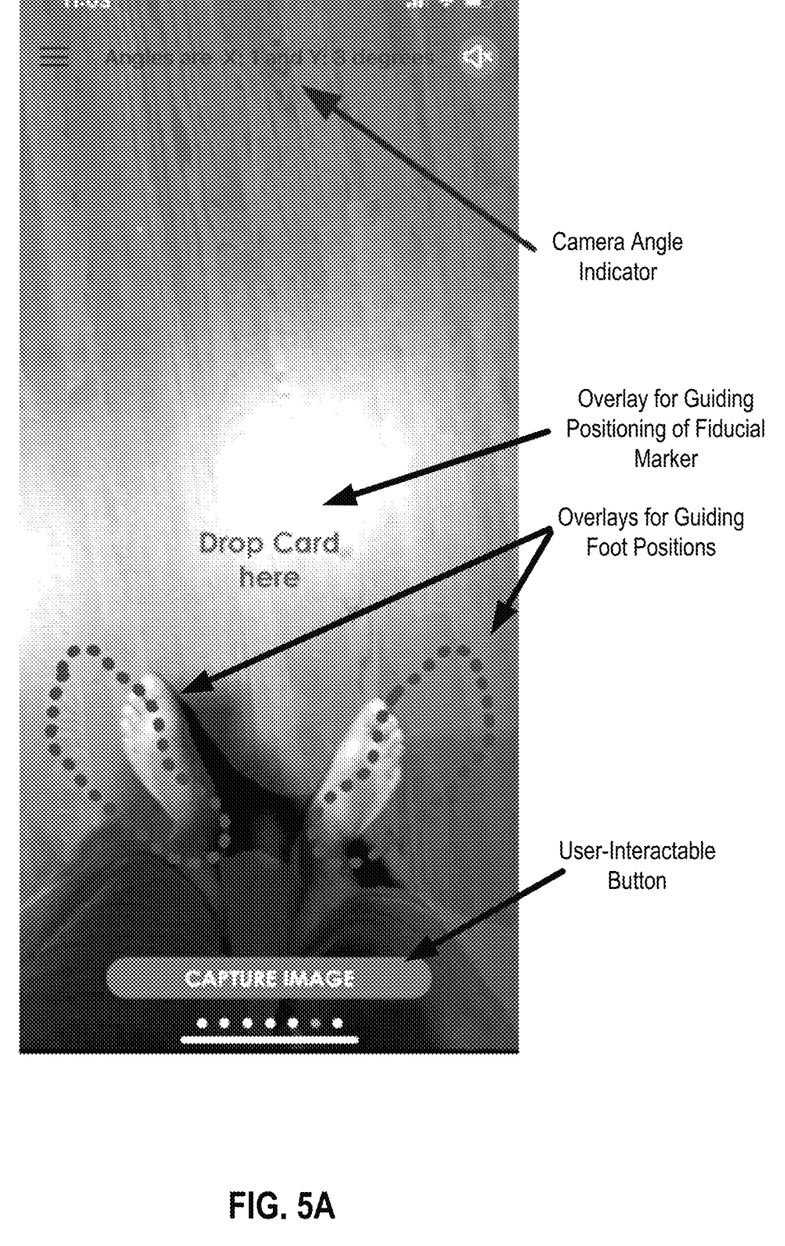
FIG. 5A shows an exemplary user interface to facilitate image capture according to at least one embodiment.

The client device 110 may implement a user interface 112, which may allow the client device 110 to send/receive information to/from other client devices owned by the same user or different users (not shown), the data processing server 120, and the data store 130. The user interface 112 may be a graphical user interface (GUI). For example, the user interface 112 may be a web browser interface that can access, retrieve, present, and/or navigate content (e.g., web pages such as Hyper Text Markup Language (HTML) pages) provided by the data processing server 120. In at least one embodiment, the user interface 112 may be a standalone application (e.g., a mobile "app," etc.) or may include a web browser implementing a web application that enables a user to use the client device 110 to send/receive information to/from other client devices, the data processing server 120, and the data store 130. An exemplary user interface is illustrated in FIG. 5A, which facilitates image capture of the user's foot or feet.

The client device 110 may include a camera 114, which may be in the form of a peripheral device that is communicatively coupled to the client device 110 (e.g., via the network 105 or via a direct physical connection), or in the form a built-in camera. The camera 114 may be adapted to capture high-resolution images (e.g., images having a resolution of 2160×3840 pixels or greater) and generate real-time video feeds.

The client device 110 may further include a light detection and ranging (LiDAR) device 116, which may be in the form of a peripheral device that is communicatively coupled to the client device 110 (e.g., via the network 105 or via a direct physical connection), or in the form a built-in LiDAR device. The LiDAR device 116 may be configured to obtain depth map images from which point cloud data can be generated. The LiDAR device 116 may include one or more laser sources for producing and emitting signals and one or more detectors for detecting the signals reflected back from the objects. The LiDAR device 116 may include spectral filters to filter out spurious electromagnetic waves having wavelengths (frequencies) that are different from the wavelengths (frequencies) of the emitted signals. In some implementations, the LiDAR device 116 can include directional filters (e.g., apertures, diffraction gratings, and so on) to filter out electromagnetic waves that can arrive at the detectors along directions different from the retro-reflective directions for the emitted signals. The LiDAR device 116 may use various other optical components (including, but not limited to, lenses, mirrors, gratings, optical films, interferometers, spectrometers, local oscillators) to enhance sensing capabilities of the sensors.

In at least one embodiment, the data processing server 120 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components from which digital contents may be retrieved. In at least one embodiment, the data processing server 120 may be a server utilized by the client device 110, for example, to process captured images. In at least one embodiment, the data processing server hosts a website that is configured to provide in-browser functionality for capturing images of a user's feet when accessed and utilized by the client device 110. In at least one embodiment, additional data processing servers may be present. In at least one embodiment, the data processing server 120 utilizes an image processing component 122 to perform segmentation on images received from the client device 110, one or more deep learning models 124 to implement the segmentation, and a model training component 126 to train the one or more deep learning models 124 and produce training sets. The functionality of the data processing server 120 is described in greater detail with respect to FIG. 2.

In at least one embodiment, the data store 130 may include one or more of a short-term memory (e.g., random access memory), a cache, a drive (e.g., a hard drive), a flash drive, a database system, or another type of component or device capable of storing data. The data store 130 may also include multiple storage components (e.g., multiple drives or multiple databases) that may also span multiple computing devices (e.g., multiple server computers). In at least one embodiment, the data store 130 may be cloud-based. One or more of the devices of system architecture 100 may utilize their own storage and/or the data store 130 to store public and private data, and the data store 130 may be configured to provide secure storage for private data.

In at least one embodiment, the data store 130 stores and maintains historical image data 132, which may include a collection of scanned foot images. The foot images may correspond to raw image data that may have associated depth map data. In some embodiments, the historical image data 132 includes data that has been processed by the data processing server 120, for example, images that have been segmented and labeled. In at least one embodiment, the data store 130 includes training data 134 for training the one or more deep learning models 124, such as segmented and labeled images. In at least one embodiment, the training data 134 includes synthetic training data that is generated based on historical image data 132 and/or other training data 134. The generation of synthetic training data is described in greater detail with respect to FIG. 3. In at least one embodiment, the user data 136 may include, for example, data descriptive of individuals who have interacted with the data processing server 120 via their respective client devices, including names, contact information, physiological data, and physical measurement data. In at least one embodiment, the data store 130 may be used for data back-up or archival purposes.

In at least one embodiment, the deep learning models 124 of the data processing server 120 utilize one or more of a decision tree or a support vector machine (SVM). In at least one embodiment, the deep learning models 124 include one or more deep networks comprising multiple levels of linear and/or non-linear operations. In some embodiments, the deep learning models may utilize a region-based convolutional neural network (RCNN), such as Mask RCNN. Mask RCNN is a computer vision algorithm that generates a proposal about a region where an object may be located based on an input image, predicts a class of the object, then modifies and refines a bounding box around the object to generate a mask of the object at the pixel level based on the original proposal. The bounding box may be proposed, for example, using a selective search algorithm. A final set of object classifications for objects identified within the input image may be made with linear SVMs.

In at least one embodiment, the model training component 126 of the data processing server 120 utilizes compiled and stored data (e.g., historical image data 132 and training data 134) in the data store 130 to train one or more of the deep learning models 124. In some embodiments, the model training component 126 partitions the training data 134 into a training set (e.g., ninety percent of the available data). The partitioning of the training data 134 may be via k-fold cross-validation. In k-fold cross-validation, an original sample may be randomly partitioned into k equal sized subsamples. Of the k subsamples, a single subsample is retained as the validation data for testing the model, and the remaining k−1 subsamples are used as training data. The cross-validation process is then repeated k times, with each of the k subsamples used exactly once as the validation data.

For purpose of illustration only, rather than limitation, aspects of the disclosure describe the training of one or more deep learning models and utilizing the one or more deep learning models in a process to compute one or more physical dimensions of feet from an input image. In some embodiments, one or more heuristic models or rule-based models may be used.

Although each of the client device 110, the data processing server 120, and the data store 130 are depicted in FIG. 1 as single, disparate components, these components may be implemented together in a single device or networked in various combinations of multiple different devices that operate together. In at least one embodiment, some or all of the functionality of the data processing server 120 and/or the data store 130 may be performed by the client device 110, or by other devices. In an exemplary embodiment, the client device 110 may be within close proximity of or integrated with the data processing server 120, for example, as part of a scanning kiosk. In such embodiments, the client device 110 may implement the functionality of the image processing component 122, or may utilize the data processing server 120 to implement some or all of the functionality of the image processing component 122.

Although embodiments of the disclosure are discussed in terms analyzing images containing feet and computing physical dimensions of feet, such embodiments are generally applicable to the identification and analysis of other parts or regions of a user's body, and such analysis may be used to generate recommendations of devices adapted to support and/or treat conditions associated with such parts or regions of the user's body.

Figure 2:
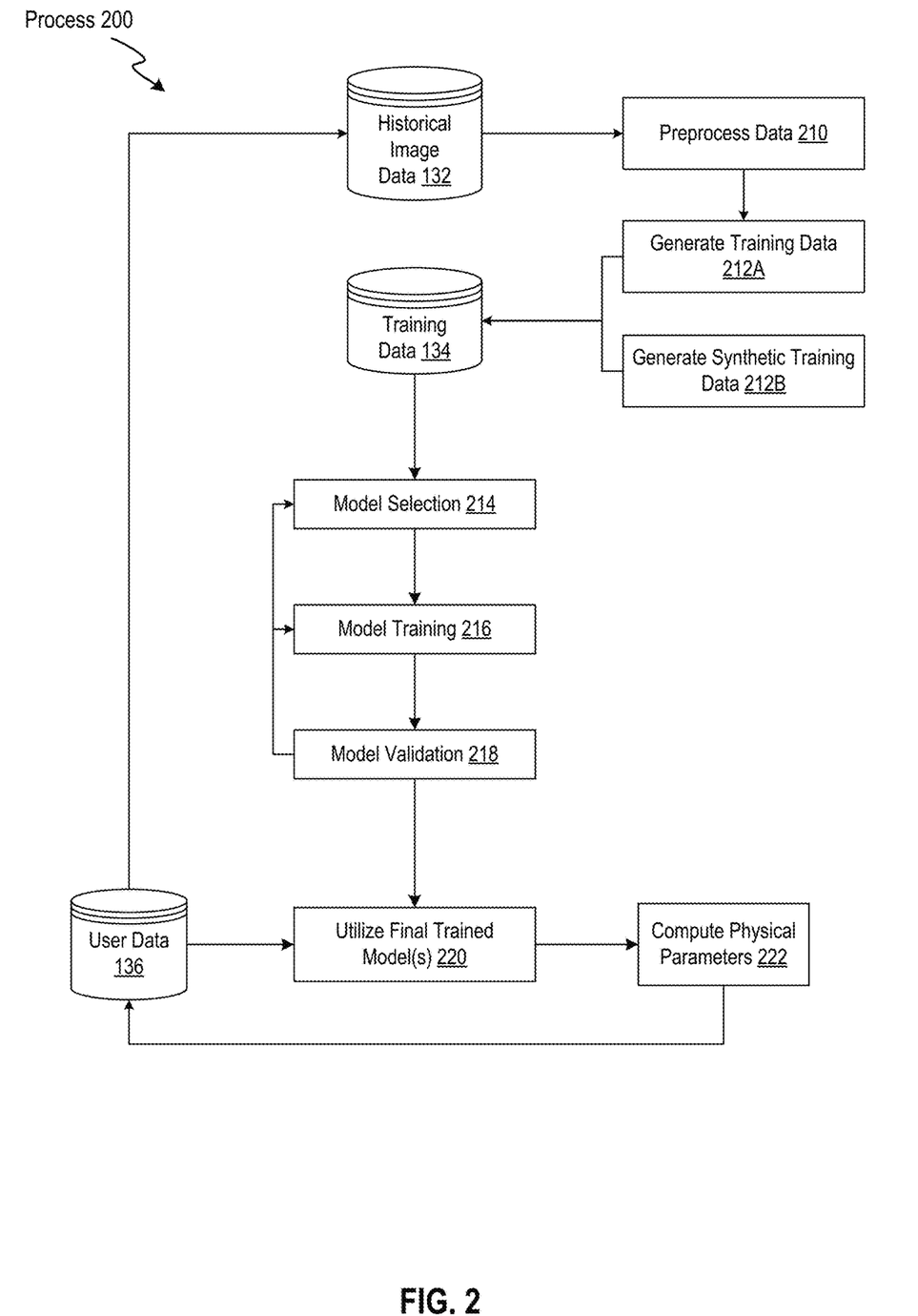
FIG. 2 is a block diagram illustrating a process for training and implementing deep learning models for determining physical parameters of a user's foot or feet according to at least one embodiment.

FIG. 2 is a block diagram illustrating a process 200 for training and implementing deep learning models for determining physical parameters of a user's foot or feet according to at least one embodiment. In at least one embodiment, the process 200 is implemented by the data processing server 120. In other embodiments, some or all of the elements of the process 200 are performed by the client device 110 and/or another device.

At block 210, the data preprocessing is performed (e.g., by the model training component 126) to preprocess historical image data 132 into a format that is acceptable for use as training data for the one or more deep learning models 124. At block 212A, training data 134 is generated from the preprocessed image data. The training data 134 may include, for each image of the historical image data 132 (or a subset thereof), objects identified within the image and associated classifications (e.g., foot, heel, toes, background, clothing, etc.).

Figure 3:
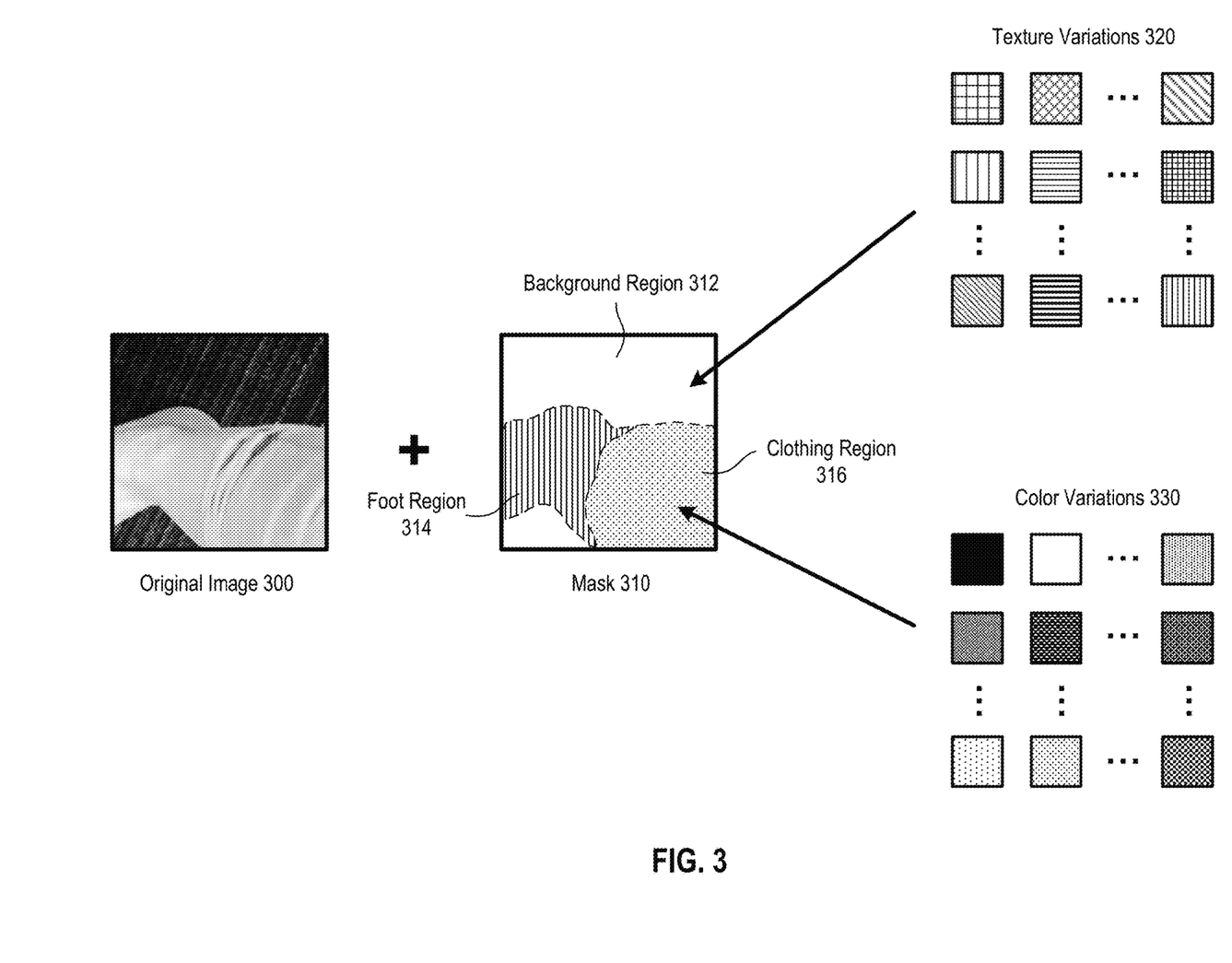
FIG. 3 illustrates the generation of synthetic training data according to at least one embodiment.

At block 212B, synthetic training data may be generated to supplement the training data 134 generated from block 212A. For example, for a subset of segmented and classified images from the training data 134, a plurality of synthetic images are generated. An exemplary process is illustrated in FIG. 3, where a mask 310 (e.g., generated as a result of segmentation performed using Mask RCNN) is used to selectively apply colors and textures to the segmented regions identified in an original image 300. For example, the background region 312 may be varied based on a collection of common floor textures (texture variations 320), for which there may be, for example, at least 1000 different textures. The clothing region 316 may be varied in terms by color across a range of possible clothing colors (color variations 330), for which there may be, for example, at least 1000, 10000, or more different colors. The foot region 314 may be varied in terms of color across a range of possible skin tones.

An exemplary process for generating synthetic training data is now described. In at least one embodiment, a labeled training image is identified within a set of labeled training images (e.g., the training data 134). For example, each labeled training image may have three labels: foot region, clothing region, and background region. In some scenarios, no clothing region is identified, for example, when no clothing is present in the image. The labeled training image may also have an associated mask image that segments the identified objects within the image. The plurality of segmented regions within the labeled training image, and a plurality of synthetic images are then generated based on the labeled training image. For each segmented region within the image, a color and/or texture is varied such that various permutations of the labeled training image are generated and none of the generated synthetic images are identical in terms of color and texture. The synthetic images are then included within the set of labeled training images to produce an augmented set of labeled training images stored in the training data 134. The one or more deep learning models 124 can then be trained using the augmented set of labeled training images.

At block 214, the process 200 performs model selection. For example, different models (e.g., algorithms) may be tested. In some embodiments, the selected model includes a Mask RCNN model.

At block 216, model training is performed for object segmentation and classification, and at block 218, model validation is performed. In some embodiments, a first percentage (e.g., 90%) of the training data 134 is used to train the model(s) and a second percentage (e.g., the remaining 10%) of the training data 134 that was not used for the training is used to validate the model(s). After training the model with the first percentage and validating the model with the second percentage, the model(s) may be trained with the full amount (e.g., 100%) of the training data 134.

In some embodiments, the model training component 126 performs hyperparameter tuning using, for example, exhaustive grid search and 10-fold cross validation to tune model parameters. In some embodiments, a model may include parameters that may be tuned to account for conditions such as class imbalance and overfitting. The model may utilize a multidimensional hyperplane in the space of the features inputted that would be used to classify data. The data may be mapped from the feature space to another defined hyperplane, thus allowing more complex datasets to be discriminated properly. Use of kernel functions (e.g., radial basis function (RBF) kernel) may allow computationally efficient learning in the hyperplane space.

At block 220, one or more final trained models are utilized. User data 136 (e.g., one or more images of a user's foot) may be used as input for the final trained models. In at least one embodiment, the user data 136 may be added to the historical image data 132, and may be used at block 210 and onward (e.g., via a feedback loop) to update (e.g., re-train) the trained models via model training.

Figure 4A:
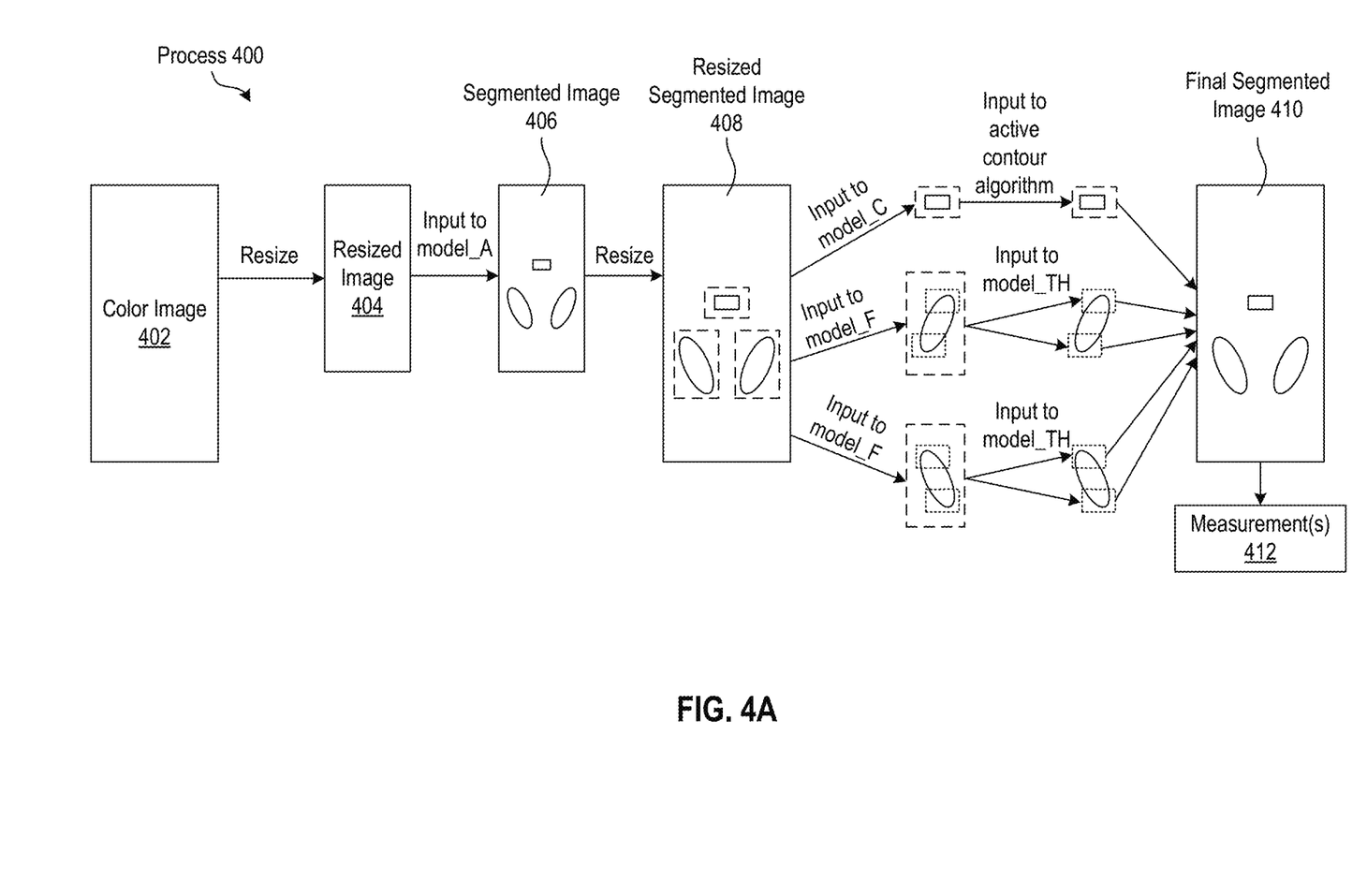
FIG. 4A is a block diagram illustrating a process of segmenting a user-captured image of a foot or feet to compute physical parameters of the foot or feet based on a fiducial marker present in the image according to at least one embodiment.
Figure 4B:
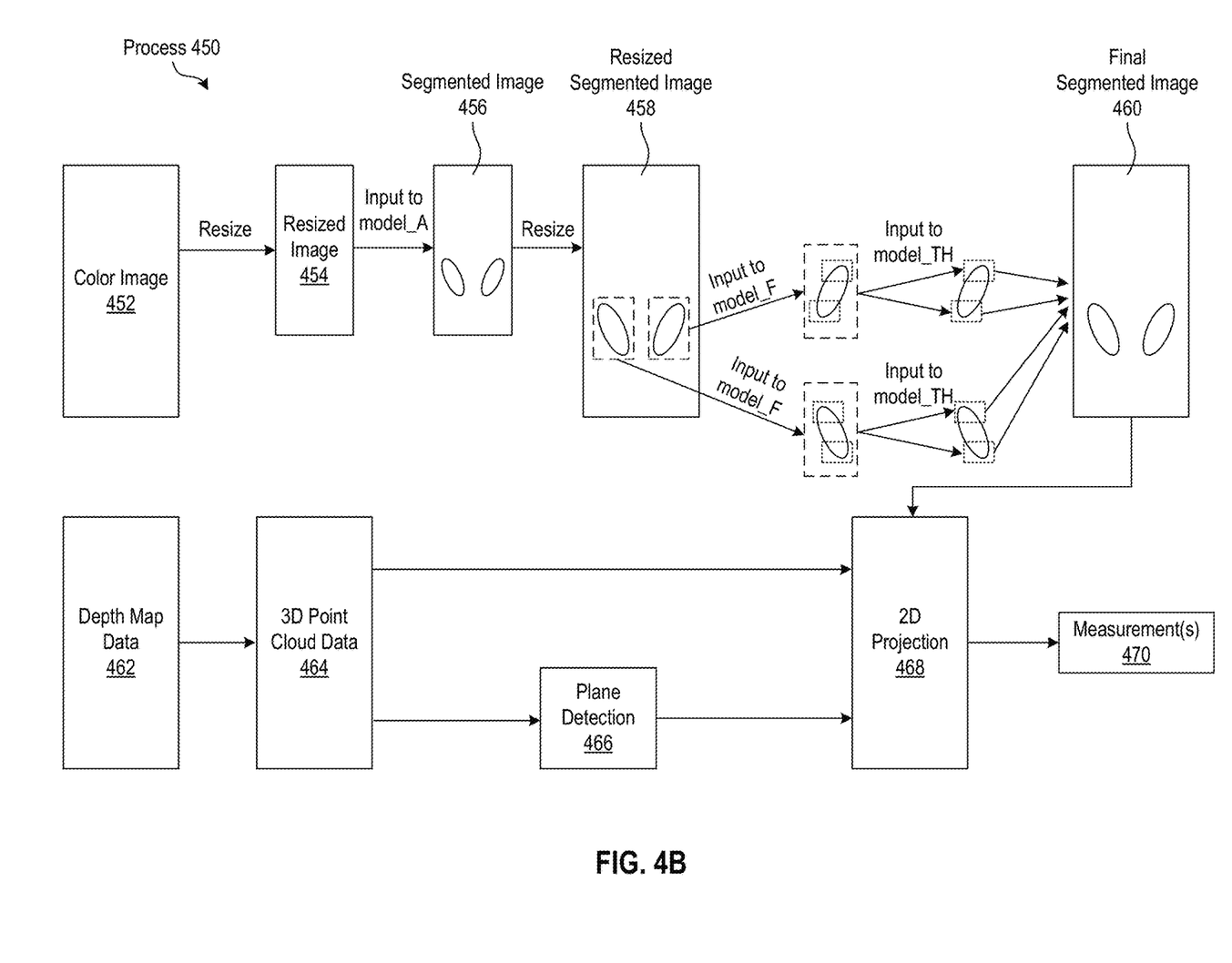
FIG. 4B is a block diagram illustrating a process of segmenting a user-captured image of a foot or feet to compute physical parameters of the foot or feet based on a depth map according to at least one embodiment.

FIGS. 4A and 4B illustrate various models used for the purposes of performing segmentation on captured foot images. Specifically, FIG. 4A is a block diagram illustrating a process 400 of segmenting a user-captured image of a foot or feet to compute physical parameters of the foot or feet based on a fiducial marker present in the image according to at least one embodiment. FIG. 4B is a block diagram illustrating a process 450 of segmenting a user-captured image of a foot or feet to compute physical parameters of the foot or feet based on a depth map according to at least one embodiment. Each process begins by capturing one or more images at the user device. For example, as illustrated in FIG. 5A, a web application or a mobile application (or "app") implemented by the user device (e.g., the client device 110) is used to facilitate image capture. In at least one embodiment, a single image frame is captured, which may have variable dimensions depending on the device used. For example, an image having dimensions of 2160×3840 may be used. The mobile app may require that the camera is oriented substantially along a normal direction of the surface upon which the user is standing in order to prevent or reduce image distortion. In at least one embodiment, the camera angles may be displayed in real-time by the user device to guide the user. An appropriate angular range may be, for example, from −5 to 5 degrees with respect to each axis that runs parallel to the surface.

In at least one embodiment, the user interface (e.g., web application or mobile app) may include one or more overlays over real-time video display to guide the positions and orientations of the user's feet, as well as for guiding the placement of a reference object (which may be referred to as a "fiducial marker") within the camera view. In at least one embodiment, the user interface may further include a user-interactable button that the user can select when they are ready to proceed with the image capture. The selection of the button may be performed as a single user action that triggers the image capture. The result of the single user action may cause a color image, a burst image (one or more images in succession), video, a depth map, an infrared image, multiple images captured at different orientations and/or different angles (e.g., via multi-camera system, such as a stereoscopy camera), or a combination thereof to be captured. It is to be understood that other single user actions may be performed as well, including using an on-screen sliding button, a mechanical button located on the user device, a voice command, a gaze interaction, or other simple user-based interaction that can act as a confirmatory input.

Figure 5B:
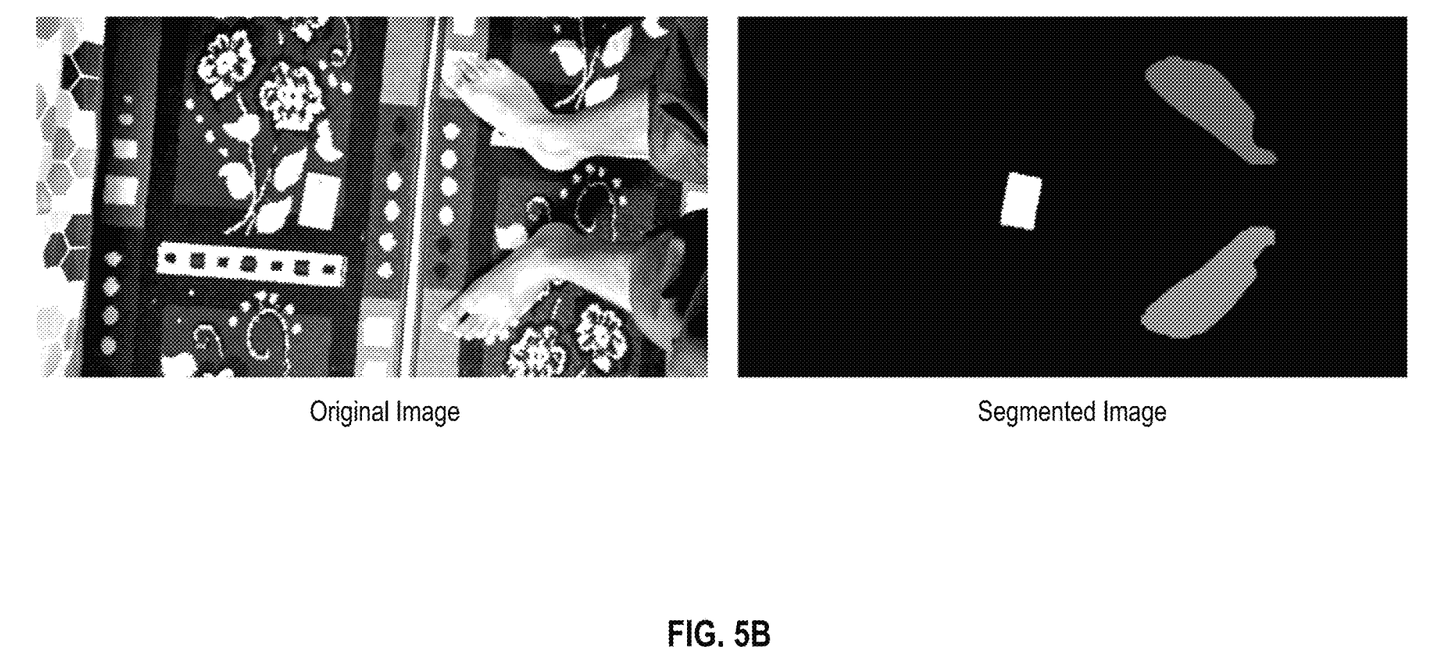
FIG. 5B illustrates identification of objects within an image according to at least one embodiment.

Once the one or more images are captured (e.g., in response to the single user action), they may be transmitted to a server for processing (e.g., the data processing server 120). Referring to FIG. 4A, a color image 402 is provided as input to a first deep learning model ("model_A"). In some embodiments, the color image 402 is first resized to a smaller resized image 404 to facilitate faster computation prior to being provided as input. The purpose of the first deep learning model is to detect the locations of objects (e.g., a reference object such as a credit-card shaped object, the left foot, and the right foot) under various conditions such as different lighting conditions, different backgrounds, different object colors, etc. FIG. 5B is an example of an original image used as input (left) and a segmented image showing identified objects (right) as output from model_a, which includes the locations and shapes of three objects present in the original image.

Figure 5C:
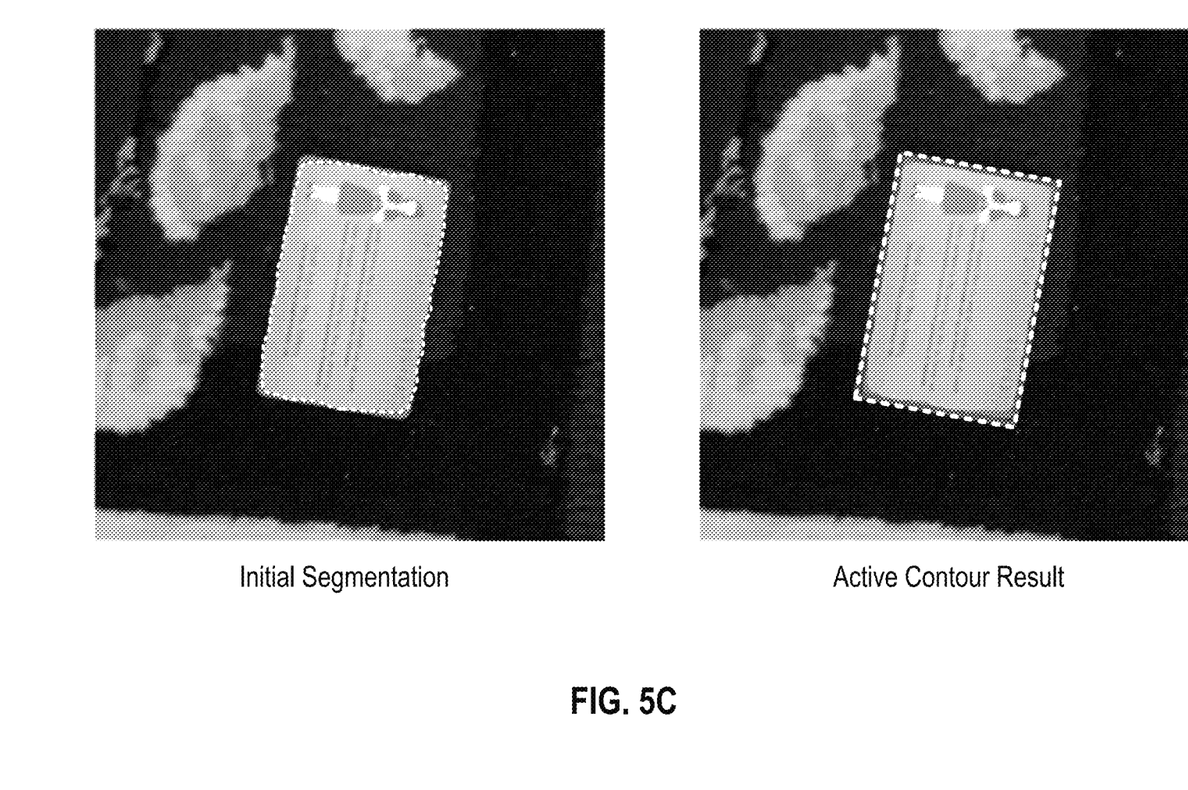
FIG. 5C illustrates the use of active contour segmentation to identify the contours of a fiducial marker according to at least one embodiment.

The output image of model_a (segmented image 406) may then be resized (resized segmented image 408) prior to being provided as input to a second deep learning model ("model_c"). In at least one embodiment, a smaller image (e.g., a 640×640 region) may be obtained by cropping the resized segmented image 408 at a region around the centroid of the identified fiducial marker, and model_c is then applied to the smaller image to segment the fiducial marker. In at least one embodiment, the fiducial marker is a credit card shaped object, which may be any substantially flat object having the lateral and longitudinal dimensions of a standard credit card (i.e., 85.60 mm×53.98 mm). It is noted that a credit card shaped object is merely illustrative, as any other type of fiducial marker may be utilized provided that it is of known dimensions and is identifiable within an image. As used herein, the term "known dimension" refers to a physical dimension of a standard-sized object, or any object for which the physical dimension has been directly measured or is known, used for calibrating nearby objects in the same image. The known dimension may be associated with a segmented object identified as the standard-sized object during image processing, and used for subsequent measurement computations. In at least one embodiment, when the fiducial marker is a square or rectangular object (e.g., a credit card), an active contour segmentation algorithm may be applied to the resized segmented image 408 with a shape constraint (e.g., a constraint on a ratio of credit card length to credit card width) to address imperfect boundaries of the segmented fiducial marker. Application of the active contour algorithm is depicted in FIG. 5C, for which an irregularly shaped contour from the initial segmentation is replaced with a rectangular contour.

Figure 5D:
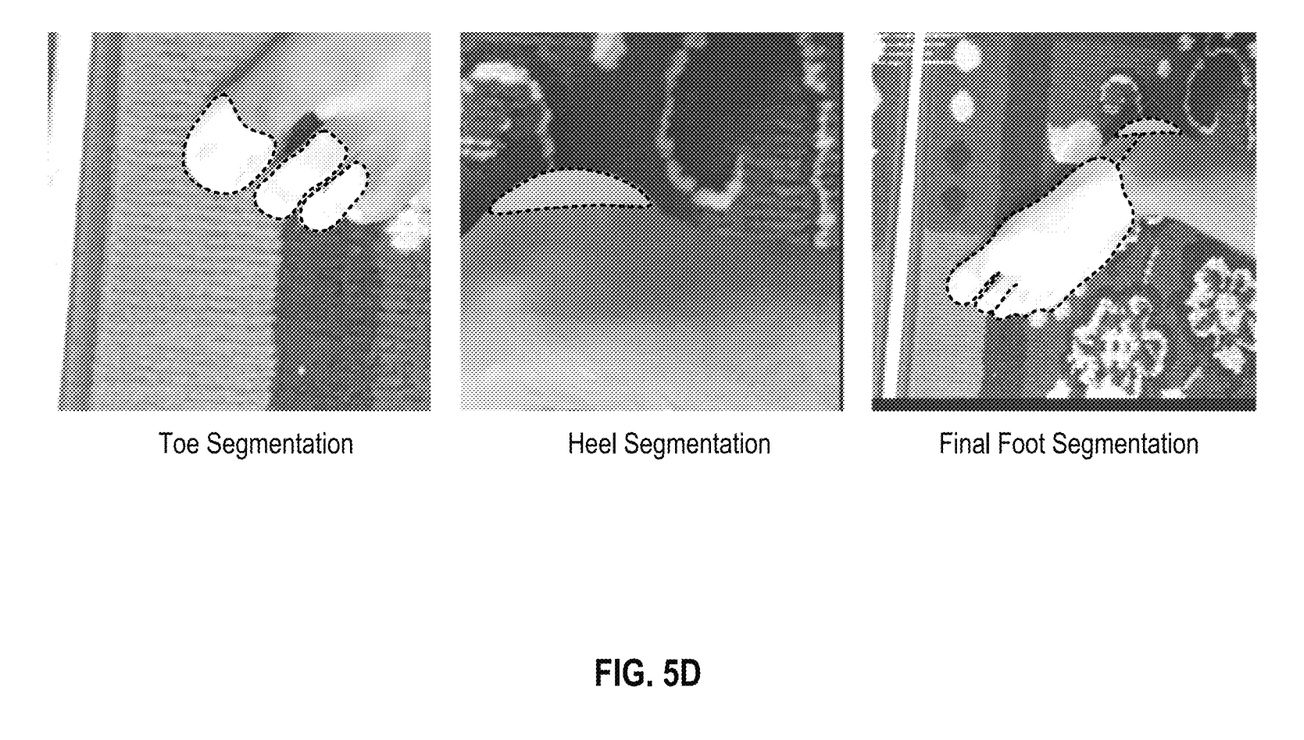
FIG. 5D illustrates segmentation of a foot based on separate segmentation to identify toe and heel regions according to at least one embodiment.

The output image of model_a (resized segmented image 408) may also be provided as input to a third deep learning model ("model_F"). In at least one embodiments, a two-foot image is generated by cropping a smaller region (e.g., a 1280×1280 region) around the centroid of each foot detected from model_A, and model_F is applied to each cropped foot image to segment the foot region. Each segmented foot region is then provided to a fourth deep learning model ("model_TH") for segmenting toe and heel regions in order to detect correct endpoints of the foot for more accurate measurements. The accuracy of the toe and heel regions by model_F may be limited since the model is trained based on global optimization of all foot area. To improve accuracy, model_TH can be trained based on local optimization by focusing on only toe and heel regions. In at least one embodiment, prior to applying model_TH, the segmented image of each foot is further cropped into sub-images (e.g., into 514×514 sub-images), with each sub-image containing only toes and heels. In at least one embodiment, the complete segmented foot is reconstructed by combining all segmented toe, heel, and foot regions into a final segmented image 410 (see FIG. 5D). In at least one embodiment, one or more measurement 412 (e.g., foot length, foot width, etc.) of each foot are computed based on the segmented fiducial marker, which is used to provide a distance per pixel scaling factor.

Referring now to FIG. 4B, the process 450 is similar to the process 400 in terms of the deep learning models used, except that the steps of identification and analysis of a fiducial marker are omitted. As shown, the process 450 includes resizing a color image 452 to produce a resized image 454, applying model_A to the resized image 454 to obtain a segmented image 456 (which includes feet and no fiducial marker), resizing the segmented image 456 to produce a resized segmented image 458, and applying model_F and model_TH to produce a final segmented image 460. The server (e.g., the data processing server 120) further receives (in addition to the color image 452) depth map data 462 and/or three-dimensional (3D) point cloud data 464 captured, for example, by a LiDAR device of the user device (e.g., the LiDAR device 116). Plane detection 466 may be utilized to identify the surface upon which the user is standing. Using the final segmented image 460 and the detected plane, a two-dimensional (2D) projection 468 of the foot as represented in point cloud data may be generated, from which one or more measurements 470 (e.g., foot length, foot width, etc.) are computed.

For simplicity of explanation, methods and processes herein are depicted and described as a series of acts. However, acts in accordance with this disclosure can occur in various orders and/or concurrently and with other acts not presented and described herein. Furthermore, not all illustrated acts may be performed to implement the methods and processes in accordance with the disclosed subject matter. In addition, those skilled in the art will understand and appreciate that the methods and processes could alternatively be represented as a series of interrelated states via a state diagram or events.

Exemplary Computer System Embodiments

Figure 6:
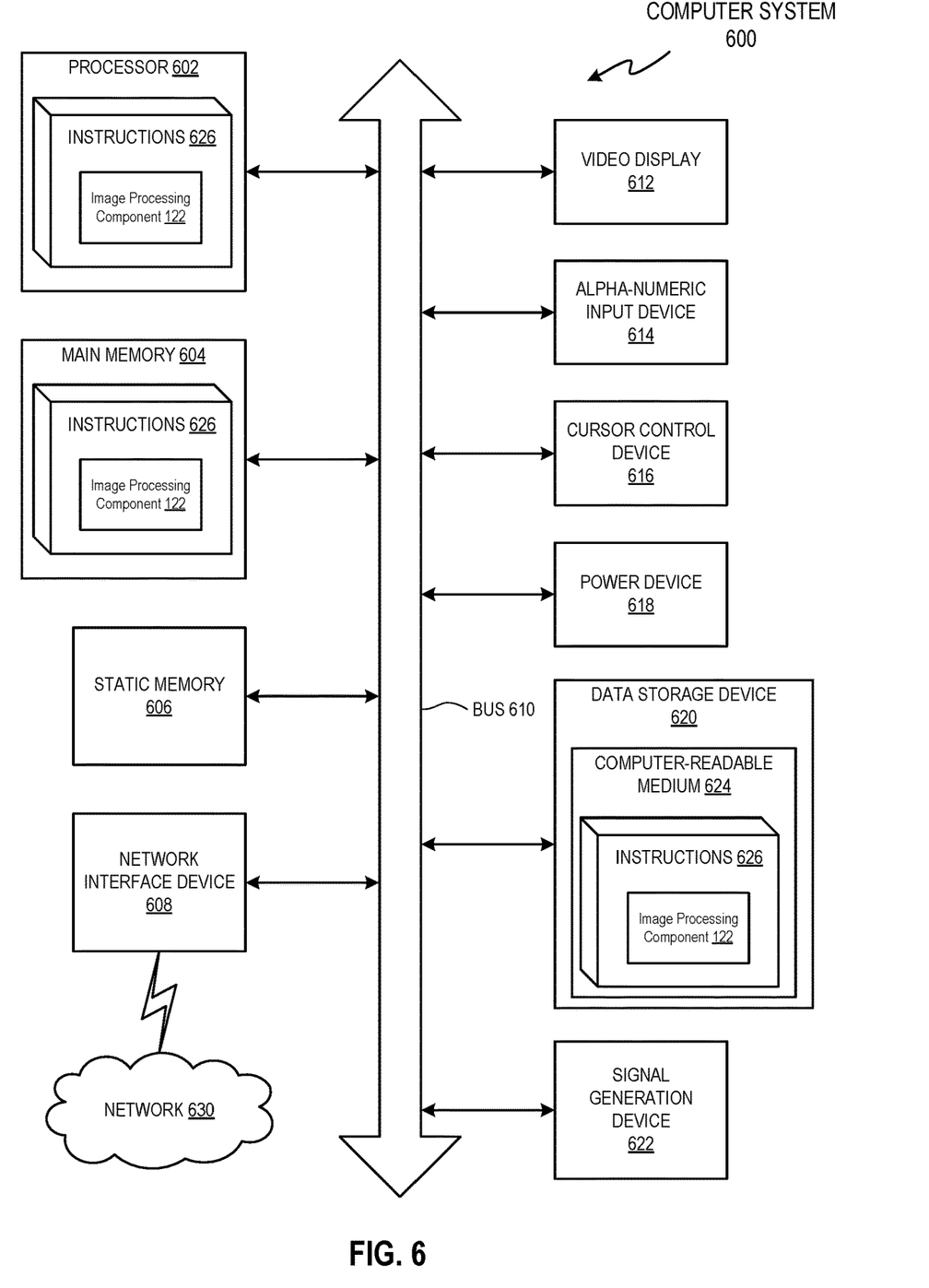
FIG. 6 is a block diagram illustrating an exemplary computer system for use in accordance with the various embodiments described herein.

FIG. 6 illustrates a diagrammatic representation of a machine in the exemplary form of a computer system 600 within which a set of instructions (e.g., for causing the machine to perform any one or more of the methodologies discussed herein) may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 600 may be utilized by or illustrative of at least some of the devices of the system architecture 100, such as the client device 110, the data processing server 120, and the data store 130.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 620, which communicate with each other via a bus 610.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an ASIC, a field programmable gate array (FPGA), a digital signal processor (DSP), network processor, or the like. The processor 602 is configured to execute instructions 626 for performing the operations and steps discussed herein, such as operations associated with the image processing component 122 or the model training component 126.

The computer system 600 may further include a network interface device 608. The computer system 600 also may include a video display unit 612 (e.g., a liquid crystal display (LCD), a cathode ray tube (CRT), or a touch screen), an alphanumeric input device 614 (e.g., a keyboard), a cursor control device 616 (e.g., a mouse), and/or a signal generation device 622 (e.g., a speaker).

Power device 618 may monitor a power level of a battery used to power the computer system 600 or one or more of its components. The power device 618 may provide one or more interfaces to provide an indication of a power level, a time window remaining prior to shutdown of computer system 600 or one or more of its components, a power consumption rate, an indicator of whether computer system is utilizing an external power source or battery power, and other power related information. In at least one embodiment, indications related to the power device 618 may be accessible remotely (e.g., accessible to a remote back-up management module via a network connection). In at least one embodiment, a battery utilized by the power device 618 may be an uninterruptable power supply (UPS) local to or remote from computer system 600. In such embodiments, the power device 618 may provide information about a power level of the UPS.

The data storage device 620 may include a computer-readable storage medium 624 on which is stored one or more sets of instructions 626 (e.g., software) embodying any one or more of the methodologies or functions described herein. The instructions 626 may also reside, completely or at least partially, within the main memory 604 and/or within the processor 602 during execution thereof by the computer system 600, the main memory 604 and the processor 602 also constituting computer-readable storage media. The instructions 626 may further be transmitted or received over a network 630 (e.g., the network 105) via the network interface device 608.

In at least one embodiment, the instructions 626 include instructions for implementing the functionality of the data processing server 120, as described throughout this disclosure. While the computer-readable storage medium 624 is shown in an exemplary embodiment to be a single medium, the terms "computer-readable storage medium" or "machine-readable storage medium" should be taken to include a single medium or multiple media (e.g., a centralized or distributed database, and/or associated caches and servers) that store the one or more sets of instructions. The terms "computer-readable storage medium" or "machine-readable storage medium" shall also be taken to include any transitory or non-transitory medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "configuring," "receiving," "converting," "causing," "streaming," "applying," "masking," "displaying," "retrieving," "transmitting," "computing," "generating," "adding," "subtracting," "multiplying," "dividing," "selecting," "parsing," "optimizing," "calibrating," "detecting," "storing," "performing," "analyzing," "determining," "enabling," "identifying," "modifying," "transforming," "aggregating," "extracting," "running," "scheduling," "processing," "capturing," "evolving," "fitting," "segmenting," "deriving," "training," "presenting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus, device, or system for performing the operations herein. This apparatus, device, or system may be specially constructed for the required purposes, or it may include a general purpose computer selectively activated or reconfigured by a computer program stored in the computer. Such a computer program may be stored in a computer- or machine-readable storage medium, such as, but not limited to, any type of disk including floppy disks, optical disks, compact disk read-only memories (CD-ROMs), and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "certain embodiments," "one embodiment," "at least one embodiment," or the like means that a particular feature, structure, or characteristic described in connection with the embodiment is included in at least one embodiment. Thus, the appearances of the phrase "certain embodiments," "one embodiment,"

"at least one embodiment," or the like in various places throughout this specification are not necessarily all referring to the same embodiment.

The present disclosure is not to be limited in scope by the specific embodiments described herein. Indeed, other various embodiments of and modifications to the present disclosure, in addition to those described herein, will be apparent to those of ordinary skill in the art from the description and accompanying drawings. Thus, such other embodiments and modifications are intended to fall within the scope of the present disclosure. Further, while the present disclosure has been described in the context of a particular embodiment in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A method of computing one or more physical parameters of a user's foot or feet, the method comprising:
    providing, to a user device by a server, access to a web application through a website presented within a web browser of the user device without a prerequisite to download the web application, another web application, or software, the web application being configured to provide in-browser functionality to the user device to facilitate capturing images of the user's foot or feet in a device independent manner without redirecting the web browser away from the website from which the web application was accessed;
    receiving, by the server from the user device, an image of the user's foot or feet captured using the web application; and
    processing, by the server, the image or causing, by the server, the image to be processed to compute one or more physical parameters of the user's foot or feet based on segmentation to identify the user's foot or feet present in the image.

2. The method of claim 1, wherein the web application is configured to facilitate capturing images of the user's foot or feet without causing redirection of a browser implemented by the user device.

3. The method of claim 1, wherein the segmentation comprises identifying a fiducial marker present in the image, and wherein the one or more physical parameters of the user's foot or feet are computed based on at least one known dimension of the identified fiducial marker.

4. The method of claim 1, wherein the one or more physical parameters of the user's foot or feet are computed based on depth map data obtained via a LiDAR sensor of the user device during image capture.

5. The method of claim 1, wherein one of the one or more physical parameters include a recommended shoe size and/or a foot width.

6. The method of claim 1, further comprising:
    transmitting the one or more physical parameters to the user device to be presented to the user.

7. The method of claim 1, wherein the image was captured by a camera of the user device when the direction of the camera was oriented substantially along a normal direction of a surface on which the user's foot or feet were positioned.

8. A system comprising:
    one or more memory devices;
    at least one processing device operatively coupled to the one or more memory devices, wherein the at least one processing device is configured to:
        provide, to a user device, access to a web application through a website presented within a web browser of the user device without a prerequisite to download the web application, another web application, or software, the web application being configured to provide in-browser functionality to the user device to facilitate capturing images of a user's foot or feet in a device independent manner without redirecting the web browser away from the website from which the web application was accessed;
        receive, from the user device, an image of the user's foot or feet captured using the web application; and
        process the image or cause the image to be processed to compute one or more physical parameters of the user's foot or feet based on segmentation to identify the user's foot or feet present in the image.

9. The system of claim 8, wherein the web application is configured to facilitate capturing images of the user's foot or feet without causing redirection of a browser implemented by the user device.

10. The system of claim 8, wherein the segmentation comprises identifying a fiducial marker present in the image, and wherein the one or more physical parameters of the user's foot or feet are computed based on at least one known dimension of the identified fiducial marker.

11. The system of claim 8, wherein the one or more physical parameters of the user's foot or feet are computed based on depth map data obtained via a LiDAR sensor of the user device during image capture.

12. The system of claim 8, wherein one of the one or more physical parameters include a recommended shoe size and/or a foot width.

13. The system of claim 8, wherein the at least one processing device is further configured to:
    transmit the one or more physical parameters to the user device to be presented to the user.

14. The system of claim 8, wherein the image was captured by a camera of the user device when the direction of the camera was oriented substantially along a normal direction of a surface on which the user's foot or feet were positioned.

15. A non-transitory computer-readable medium having instructions encoded thereon that, when executed by a processing device, cause the processing device to:
    provide, to a user device, access to a web application through a website presented within a web browser of the user device without a prerequisite to download the web application, another web application, or software, the web application being configured to provide in-browser functionality to the user device to facilitate capturing images of a user's foot or feet in a device independent manner without redirecting the web browser away from the website from which the web application was accessed;
    receive, from the user device, an image of the user's foot or feet captured using the web application; and
    process the image or cause the image to be processed to compute one or more physical parameters of the user's foot or feet based on segmentation to identify the user's foot or feet present in the image.

16. The non-transitory computer-readable medium of claim 15, wherein the web application is configured to facilitate capturing images of the user's foot or feet without causing redirection of a browser implemented by the user device.

17. The non-transitory computer-readable medium of claim 15, wherein the segmentation comprises identifying a fiducial marker present in the image, and wherein the one or more physical parameters of the user's foot or feet are computed based on at least one known dimension of the identified fiducial marker and/or on depth map data obtained via a LiDAR sensor of the user device during image capture.

18. The non-transitory computer-readable medium of claim 15, wherein one of the one or more physical parameters include a recommended shoe size and/or a foot width.

19. The non-transitory computer-readable medium of claim 15, wherein the instructions further cause the processing device to:
   transmit the one or more physical parameters to the user device to be presented to the user.

20. The non-transitory computer-readable medium of claim 15, wherein the image was captured by a camera of the user device when the direction of the camera was oriented substantially along a normal direction of a surface on which the user's foot or feet were positioned.

\* \* \* \* \*